US012706065B2

(12) United States Patent
Chen et al.

(10) Patent No.: US 12,706,065 B2
(45) Date of Patent: Aug. 11, 2026

(54) DISPLAY DEVICE INPUT CIRCUIT, DISPLAY DEVICE AND CONTROL METHOD THEREOF

(71) Applicants: K-Tronics (Suzhou) Technology Co., Ltd., Suzhou (CN); BOE Technology Group Co., Ltd., Beijing (CN)

(72) Inventors: Yizhou Chen, Beijing (CN); Liushuai Zhao, Beijing (CN); Ling Yang, Beijing (CN)

(73) Assignees: K-Tronics (Suzhou) Technology Co., Ltd., Suzhou (CN); BOE TECHNOLOGY GROUP CO., LTD., Beijing (CN)

( * ) Notice: Subject to any disclaimer, the term of this patent is extended or adjusted under 35 U.S.C. 154(b) by 165 days.

(21) Appl. No.: 18/841,887

(22) PCT Filed: May 10, 2023

(86) PCT No.: PCT/CN2023/093240

§ 371 (c)(1),
(2) Date: Aug. 27, 2024

(87) PCT Pub. No.: WO2024/001537

PCT Pub. Date: Jan. 4, 2024

(65) Prior Publication Data

US 2025/0174210 A1 May 29, 2025

(30) Foreign Application Priority Data

Jun. 29, 2022 (CN) ......................... 202210757382.7

(51) Int. Cl.
*G06F 3/038* (2013.01)
*G09G 5/00* (2006.01)

(52) U.S. Cl.
CPC ......... *G09G 5/006* (2013.01); *G09G 2370/04* (2013.01); *G09G 2370/12* (2013.01)

(58) Field of Classification Search
CPC . G09G 5/006; G09G 2370/04; G09G 2370/12
(Continued)

(56) References Cited

U.S. PATENT DOCUMENTS

2004/0021628 A1 2/2004 Zhang et al.
2008/0117984 A1 * 5/2008 Hao ....................... G09G 5/006 375/240.26
(Continued)

FOREIGN PATENT DOCUMENTS

CN 201072550 Y 6/2008
CN 201146580 Y 11/2008
(Continued)

*Primary Examiner* — Jonathan M Blancha
(74) *Attorney, Agent, or Firm* — WHDA, LLP

(57) ABSTRACT

A display device input circuit includes: an input interface; a control circuit, where the control circuit is configured to generate a channel selection signal according to a debugging signal from the debugging terminal; a multiplexing switch circuit, where the multiplexing switch circuit includes multiple groups of output channels, and the multiplexing switch circuit is configured to control one group of output channels of the multiple groups of output channels to output a communication signal according to a channel selection signal from the control circuit; and a driving circuit board, where a data input terminal of the driving circuit board is connected to the data terminal, the driving circuit board is further connected to the multiple groups of output channels to obtain the communication signal, and an output terminal of the driving circuit board is connected to a display panel.

20 Claims, 2 Drawing Sheets

(58) Field of Classification Search
USPC .......................................................... 345/204
See application file for complete search history.

(56) References Cited

U.S. PATENT DOCUMENTS

| | | | | |
|---|---|---|---|---|
| 2013/0339790 | A1* | 12/2013 | Menon | G06F 11/3656 714/30 |
| 2015/0043888 | A1* | 2/2015 | Bozarth | G06F 13/00 386/231 |
| 2018/0091575 | A1* | 3/2018 | Toba | H04N 21/8456 |
| 2020/0314398 | A1* | 10/2020 | Zhang | H01M 10/44 |

FOREIGN PATENT DOCUMENTS

| | | | |
|---|---|---|---|
| CN | 202110533 | U | 1/2012 |
| CN | 107577574 | A | 1/2018 |
| CN | 108024129 | A | 5/2018 |
| CN | 111405202 | A | 7/2020 |
| CN | 112133256 | A | 12/2020 |
| CN | 113343621 | A | 9/2021 |
| CN | 113821385 | A | 12/2021 |
| CN | 113849358 | A | 12/2021 |
| CN | 114927114 | A | 8/2022 |

* cited by examiner

DISPLAY DEVICE INPUT CIRCUIT, DISPLAY DEVICE AND CONTROL METHOD THEREOF

CROSS-REFERENCE TO RELATED APPLICATION

The present disclosure is the U.S. national phase of International Application No. PCT/CN2023/093240 filed on May 10, 2023. International Application No. PCT/CN2023/093240 claims priority to Chinese Patent Application No. 202210757382.7 filed in China on Jun. 29, 2022. Each of the above-listed applications is incorporated by reference herein in its entirety.

TECHNICAL FIELD

Embodiments of the present disclosure relate to the field of display technologies, in particular to a display device input circuit, a display device and a control method thereof.

BACKGROUND

In the related art, a SOC (System on a Chip) of a display device usually includes multiple groups of serial ports, and during debugging, each group of serial ports needs to be used to realize different functions. Accordingly, in order to implement these functions, it requires to add multiple corresponding debugging sockets. In a debugging stage or manufacturing stage, it requires to make different debugging sockets to be equipped onto a board for processing. After the board is assembled into a complete machine, it is unable to directly use the sockets on the board, and at the same time, it is also unable to modify this information. The only way to use the sockets is by disassembling the machine.

SUMMARY

Embodiments of the present disclosure provide a display device input circuit, a display device and a control method thereof.

In order to address the above-mentioned issues, the present disclosure is achieved as follows.

In a first aspect, the embodiments of the present disclosure provide a display device input circuit including:

- an input interface, where the input interface includes a debugging terminal, a data terminal and a control signal terminal;
- a control circuit, where an input terminal of the control circuit is connected to the debugging terminal, and the control circuit is configured to generate a channel selection signal according to a debugging signal from the debugging terminal;
- a multiplexing switch circuit, where an input signal terminal of the multiplexing switch circuit is connected to the control signal terminal, a channel control terminal of the multiplexing switch circuit is connected to an output terminal of the control circuit, the multiplexing switch circuit includes multiple groups of output channels, and the multiplexing switch circuit is configured to control one group of output channels of the multiple groups of output channels to output a communication signal according to a channel selection signal from the control circuit; and
- a driving circuit board, where a data input terminal of the driving circuit board is connected to the data terminal, the driving circuit board is further connected to the multiple groups of output channels to obtain the communication signal, and an output terminal of the driving circuit board is connected to a display panel.

In some embodiments, the output channels include at least two of:

- a first output channel connected to a debugging signal input terminal of the driving circuit board;
- a second output channel connected to a control signal input terminal of the driving circuit board;
- a third output channel connected to a Gamma data programming terminal of the driving circuit board; or
- a fourth output channel connected to a serial port communication terminal of the driving circuit board.

In some embodiments, the channel control terminal includes a first control terminal and a second control terminal, and the control circuit includes:

- a first node connected to the debugging terminal;
- a first control sub-circuit, where the first control sub-circuit is connected to the first node, a first reference signal line, a second reference signal line and the first control terminal, and the first control sub-circuit is configured to apply a first channel selection sub-signal to the first control terminal according to the debugging signal; and
- a second control sub-circuit, where the second control sub-circuit is connected to the first node, the first reference signal line, the second reference signal line and the second control terminal, and the second control sub-circuit is configured to apply a second channel selection sub-signal to the second control terminal according to the debugging signal;
- where the first reference signal line is configured to apply a high-level reference signal, and the second reference signal line is configured to apply a low-level reference signal.

In some embodiments, the first control sub-circuit includes:

- a first resistor, a first terminal of the first resistor being connected to the first reference signal line, and a second terminal of the first resistor being connected to the first control terminal;
- a first switch transistor, a first electrode of the first switch transistor being connected to the second terminal of the first resistor, and a second electrode of the first switch transistor being connected to the second reference signal line;
- a second resistor, where a first terminal of the second resistor is connected to a control electrode of the first switch transistor; and
- a first zener diode, where an anode of the first zener diode is connected to the second terminal of the second resistor, and a cathode of the first zener diode is connected to the first node.

In some embodiments, the second control sub-circuit includes:

- a second switch transistor, a first electrode of the second switch transistor being connected to the first reference signal line, and a first electrode of the second switch transistor being connected to the second control terminal;
- a third resistor, a first terminal of the third resistor being connected to the second control terminal, and a second terminal of the third resistor being connected to the second reference signal line;
- a fourth resistor, where a first terminal of the fourth resistor is connected to a control electrode of the second switch transistor, and a second terminal of the fourth resistor is connected to a second node;

a fifth resistor, where a first terminal of the fifth resistor is connected to the first reference signal line, and a second terminal of the fifth resistor is connected to the second node;

a sixth resistor, where a first terminal of the sixth resistor is connected to the second node, and a second terminal of the sixth resistor is connected to the second reference signal line;

a second zener diode, where an anode of the second zener diode is connected to the first node;

a first diode, where an anode of the first diode is connected to the second node, and a cathode of the first diode is connected to a cathode of the second zener diode;

a third zener diode, a cathode of the third zener diode being connected to the first node;

a seventh resistor, where a first terminal of the seventh resistor is connected to an anode of the third zener diode; and a third switch transistor, a control electrode of the third switch transistor being connected to a second terminal of the seventh resistor, a first electrode of the third switch transistor being connected to the second node, and a second electrode of the third switch transistor being connected to the second reference signal line.

In some embodiments, the input interface is a high-definition multimedia interface (HDMI), and the control signal terminal is an internal integrated circuit (IIC) terminal.

In some embodiments, the multiplexing switch circuit includes an AiP4052 chip.

In a second aspect, the embodiments of the present disclosure further provide a display device including the above-mentioned display device input circuit.

In a third aspect, the embodiments of the present disclosure further provide a method of controlling the above-mentioned display device, including:

controlling a target output channel to be in an active state via a channel selection signal from the control signal terminal, where the target output channel is one group of output channels in multiple groups of output channels of the multiplexing switch circuit; and applying a communication signal to the driving circuit board through the target output channel.

In some embodiments, the output channels include a first output channel connected to a debugging signal input terminal of the driving circuit board, a second output channel connected to a control signal input terminal of the driving circuit board, a third output channel connected to a Gamma data programming terminal of the driving circuit board and a fourth output channel connected to a serial port communication terminal of the driving circuit board.

The applying the communication signal to the driving circuit board through the target output channel includes:

applying a debugging signal to the driving circuit board through the target output channel in a case where the target output channel is the first output channel;

applying a control signal to the driving circuit board through the target output channel in a case where the target output channel is the second output channel;

programming Gamma data to the driving circuit board via the target output channel in a case where the target output channel is the third output channel; and performing serial port communication with the driving circuit board via the target output channel in a case where the target output channel is the fourth output channel.

BRIEF DESCRIPTION OF THE DRAWINGS

In order to illustrate the technical solutions of the embodiments of the present disclosure in a clearer manner, the drawings required for the description of the embodiments of the present disclosure will be described hereinafter briefly. Apparently, the following drawings merely relate to some embodiments of the present disclosure, and based on these drawings, a person of ordinary skill in the art may obtain other drawings without any creative effort.

DETAILED DESCRIPTION

The technical solutions in the embodiments of the present disclosure will be described hereinafter clearly and completely with reference to the drawings of the embodiments of the present disclosure. Apparently, the following embodiments merely relate to a part of, rather than all of, the embodiments of the present disclosure, and based on these embodiments, a person of ordinary skill in the art may, without any creative effort, obtain other embodiments, which also fall within the scope of the present disclosure.

Terms such as "first" and "second" in the embodiments of the present disclosure are used to distinguish similar objects and are not necessarily used to describe a specific order or sequence. In addition, terms such as "including" and "having" and any variations thereof are intended to cover non-exclusive inclusion. For example, a process, method, system, product or device including a series of steps or units is not limited to the steps or units that are clearly listed and may include other steps or units that are not clearly listed or are inherent to the process, method, product, or device. Moreover, the term "and/or" used in the present disclosure indicates involving at least one of connected objects, for example, A and/or B and/or C means 7 situations, including: A alone, B alone, C alone, both A and B, both B and C, both A and C, and all of A, B and C.

Embodiments of the present disclosure provide a display device input circuit.

Figure 1:
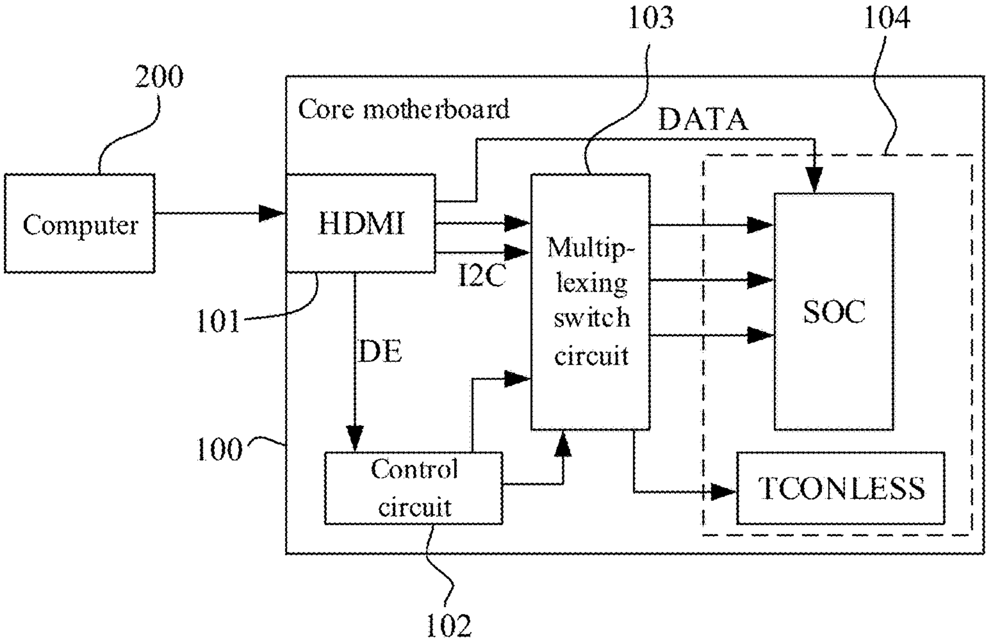
FIG. 1 is a circuit diagram of a display device input circuit according to the embodiments of the present disclosure.

As shown in FIG. 1, in one embodiment, the display device input circuit includes an input interface 101, a control circuit 102, a multiplexing switch circuit 103 and a driving circuit board 104.

In the embodiments of the present disclosure, a display device is exemplified by a display or a smart television, For example, it may be a smart TV equipped with an operating system such as Android.

The display device provides data signals and driving signals to a display panel through a TCON (Time Control, a logic board). In some embodiments, TCON may be set separately. In other embodiments, the TCON may also be provided integrated with other structures. For example, the TCON is integrated on a motherboard of a display device or on a SOC chip in which case a motherboard thereof is generally referred to as a TCONLESS motherboard.

As shown in FIG. 1, in the embodiments of the present disclosure, for illustrative purposes, the input interface 101, the control circuit 102, the multiplexing switch circuit 103 and the driving circuit board 104 are all provided on a core motherboard 100 of the display device.

The input interface 101 is configured to apply display data to the display device, and may illustratively be a high definition multimedia HDMI interface or the like.

In an exemplary embodiment, a computer 200, which is an upper computer or a debugging device, is connected to the display device through a HDMI interface using a HDMI line, where functions of respective connection terminals of the HDMI interface may refer to the related art and will not be described in detail herein.

As shown in FIG. 1, the input interface 101 includes a plurality of terminals, which may illustratively include a debugging terminal DE configured to provide debug data, a data terminal DATA configured to provide display data, and a control signal terminal IIC configured to provide control signals. In one exemplary embodiment, the control signal terminal IIC is an internal integrated circuit IIC (or I2C) terminal.

An input terminal of the control circuit 102 is connected to the debugging terminal DE. A channel control terminal of the multiplexing switch circuit 103 is connected to an output terminal of the control circuit 102, and when implemented, the control circuit 102 generates a channel selection signal according to a debugging signal from a debugging signal line, and based on the channel selection signal, the multiplexing switch circuit 103 selects one group of output channels from a plurality of groups of output channels as a target channel for outputting an communication signal. An input signal terminal of the multiplexing switch circuit 103 is connected to the control signal terminal IIC so as to output the communication signal from the control signal terminal IIC through the target channel.

A data input terminal of the driving circuit board 104 is connected to the data terminal DATA, the driving circuit board 104 is further connected to multiple groups of output channels to obtain communication signals, and an output terminal of the driving circuit board 104 is connected to the display panel.

The driving circuit board 104 in this embodiment may be one or more of TCON, TCONLESS, and SOC of the display device.

In some embodiments, the output channel includes at least two of:

- a first output channel connected to a debugging signal input terminal of the driving circuit 104;
- a second output channel connected to a control signal input terminal of the driving circuit 104;
- a third output channel connected to a Gamma data programming terminal of the driving circuit 104; or
- a fourth output channel connected to a serial port communication terminal of the driving circuit 104.

Figure 3:
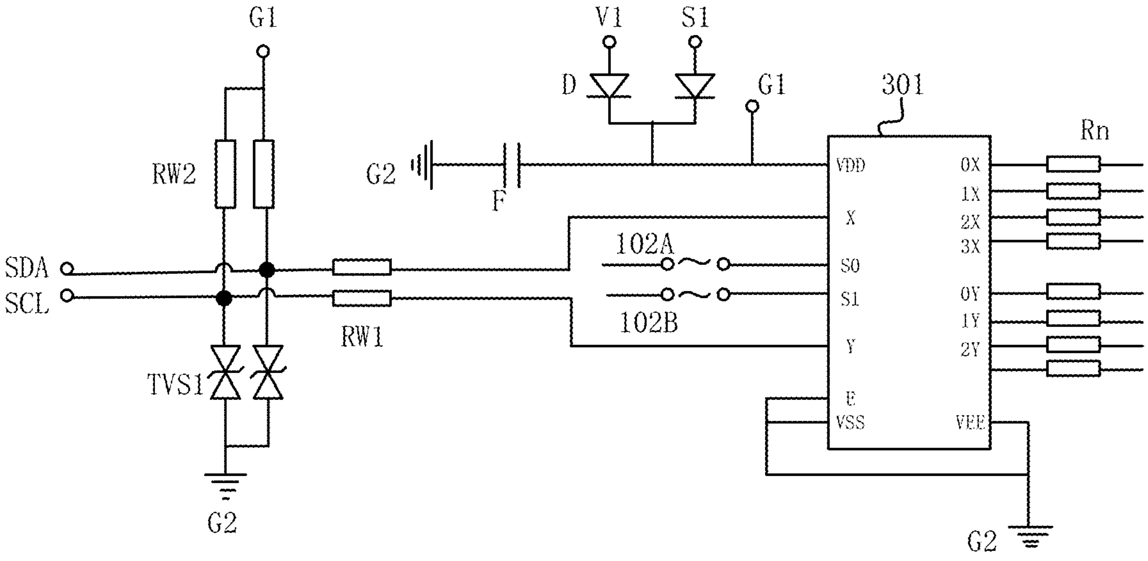
FIG. 3 is a circuit diagram of a multiplexing switch circuit according to the embodiments of the present disclosure.

As shown in FIG. 3, in one exemplary embodiment, the multiplexing switch circuit 103 includes a multiple-to-1 analog switch chip 301. In this embodiment, the AiP4052 chip is used as an illustrative example.

The AiP4052 chip is a 4-to-1 analog switch, and when implemented, one group of output channels may be selected from four groups of output channels as the target channel through the AiP4052 chip.

In one exemplary embodiment, four groups of output channels of the AiP4052 chip are respectively connected to the above-mentioned first output channel to the fourth output channel, and further, the target channel is selected from the four groups of output channels according to the channel selection signal from the control circuit 102, so as to output a corresponding communication signal, thereby to realize a specific function.

In other embodiments, the multiplexing switch circuit 103 may also be any other multiple-to-1 analog switch chip 301, such as a CD4067 chip or an AD7530LN chip, which is not further limited in the embodiments of the present disclosure. During the implementation, it is able to specifically adjust connection manners of corresponding multi-channel analog switch chip, so as to provide multiple output channels and realize the transmission of corresponding communication signals.

In some embodiments, the channel control terminal includes a first control terminal 102A connected to a pin S0 of the multiple-to-1 analog switch chip 301 and a second control terminal 102B connected to a pin S1 of the multiple-to-1 analog switch chip 301, and when implemented, both the first control terminal 102A and the second control terminal 102B are capable of applying two signals, i.e., a high-level signal and a low-level signal, to the pin S0 and the pin S1 of the multiple-to-1 analog switch chip 301, respectively, so that four combinations are included in total, and each combination corresponds to a channel selection signal of one group of output channels.

Figure 2:
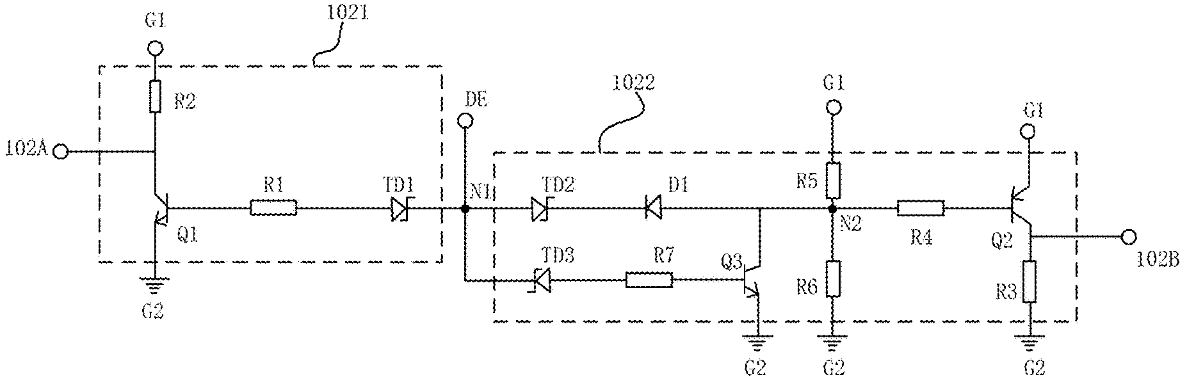
FIG. 2 is a circuit diagram of a control circuit according to the embodiments of the present disclosure.

As shown in FIG. 2, in one embodiment, the control circuit 102 includes a first control sub-circuit 1021 configured to apply a first channel selection sub-signal to the first control terminal 102A according to the debugging signal and a second control sub-circuit 1022 configured to apply a second channel selection sub-signal to the second control terminal 102B according to the debugging signal.

In one embodiment, the control circuit 102 includes a first node N1 coupled to the debugging terminal DE, and the first control sub-circuit 1021 is coupled to the first node N1, a first reference signal line G1, a second reference signal line G2 and the first control terminal 102A. The second control sub-circuit 1022 is connected to the first node N1, the first reference signal line G1, the second reference signal line G2 and the second control terminal 102B.

In this embodiment, the first reference signal line G1 is used to apply a high-level reference signal, illustratively, a 5V reference signal, and the second reference signal line G2 is used to apply a low-level reference signal, illustratively, a 0V reference signal, in other words, the second reference signal is grounded.

As shown in FIG. 2, in some embodiments, the first control sub-circuit 1021 includes:

- a first resistor R1, where a first terminal of the first resistor R1 is connected to the first reference signal line G1, and a second terminal of the first resistor R1 is connected to the first control terminal 102A;
- a first switch transistor Q1, where a first electrode of the first switch transistor Q1 is connected to the second terminal of the first resistor R1, and a second electrode of the first switch transistor Q1 is connected to the second reference signal line G2;
- a second resistor R2, where a first terminal of the second resistor R2 is connected to a control electrode of the first switch transistor Q1;
- a first zener diode TD1, where an anode of the first zener diode TD1 is connected to a second terminal of the second resistor R2, and a cathode of the first zener diode TD1 is connected to the first node N1.

Still referring to FIG. 2, in some embodiments, the second control sub-circuit 1022 includes:

a second switch transistor Q2, where a first electrode of the second switch transistor Q2 is connected to the first reference signal line G1, and a first electrode of the second switch transistor Q2 is connected to the second control terminal 102B;

a third resistor R3, where a first terminal of the third resistor R3 is connected to the second control terminal 102B, and a second terminal of the third resistor R3 is connected to the second reference signal line G2;

a fourth resistor R4, where a first terminal of the fourth resistor R4 is connected to a control electrode of the second switch transistor Q2, and a second terminal of the fourth resistor R4 is connected to a second node N2;

a fifth resistor R5, where a first terminal of the fifth resistor R5 is connected to the first reference signal line G1, and a second terminal of the fifth resistor R5 is connected to the second node N2;

a sixth resistor R6, where a first terminal of the sixth resistor R6 is connected to the second node N2, and a second terminal of the sixth resistor R6 is connected to the second reference signal line G2;

a second zener diode TD2, where an anode of the second zener diode TD2 is connected to the first node N1;

a first diode D1, where an anode of the first diode D1 is connected to the second node N2, and a cathode of the first diode D1 is connected to a cathode of a second zener diode TD2;

a third zener diode TD3, where a cathode of the third zener diode TD3 is connected to the first node N1;

a seventh resistor R7, where a first terminal of the seventh resistor R7 is connected to an anode of the third zener diode TD3;

a third switch transistor Q3, where a control electrode of the third switch transistor Q3 is connected to a second terminal of the seventh resistor R7, a first electrode of the third switch transistor Q3 is connected to the second node N2, and a second electrode of the third switch transistor Q3 is connected to the second reference signal line G2.

In the embodiments of the present disclosure, by providing the zener diodes, a circuit is in an off state before a voltage reaches a breakdown voltage of each zener diode, and it is able to make the circuit in an on state after the breakdown voltage of the zener diodes is reached. In this way, it is able to provide different channel selection signals.

In some of the embodiments, a breakdown voltage of the first zener diode TD1 is less than breakdown voltages of the second zener diode TD2 and the third zener diode TD3.

Illustratively, the breakdown voltage of the first zener diode TD1 is 5.1 V, and the breakdown voltages of the second zener diode TD2 and the third zener diode TD3 are both 8.2 V. Apparently, each zener diode may be selected according to needs, and the breakdown voltage thereof is not limited thereto.

As shown in FIG. 3, for illustrative purposes, the multiplexing switch circuit 103 includes the AiP4052 chip. The AiP4052 chip includes four groups of output channels, namely, 0X/0Y, 1X/1Y, 2X/2Y and 3X/3Y output channels, and each output channel is connected to the driving circuit board 104 via a voltage dividing resistor Rn. A pin VDD of the AiP4052 chip is connected to a power source circuit, a pin E, a pin VSS, and a pin VEE are connected to a ground line. A pin X and a pin Y are connected to the control signal terminal IIC, and the pin S0 and the pin S1 are respectively connected to the first control terminal 102A and the second control terminal 102B of the control circuit 102, so as to obtain the channel selection signal.

In one embodiment, the control signal terminal IIC includes a first signal terminal SDA and a second signal terminal SCL. As shown in FIG. 3, in one embodiment, a voltage stabilizing circuit is provided between the pin X and the first signal terminal SDA, and a voltage stabilizing circuit is also provided between the pin Y and the second signal terminal SCL. Two voltage stabilizing circuits have a same structure, and each voltage stabilizing circuit includes a first voltage stabilizing resistor RW1, a second voltage stabilizing resistor RW2 and a transient voltage suppression diode TVS1.

An illustrative description is given by using the voltage stabilizing circuit between the pin X and the first signal terminal SDA as an example. As shown in FIG. 3, the first voltage stabilizing resistor RW1 is connected in series between the pin X and the first signal terminal SDA, a first terminal of the second voltage stabilizing resistor RW2 is connected to the first reference signal line G1, and the other terminal thereof is connected to the first signal terminal SDA. One terminal of the transient suppression diode TVS1 is connected to the first signal terminal SDA, and the other terminal thereof is connected to the second reference signal line G2.

The power source circuit includes a capacitor F and two diodes D, where one terminal of the capacitor F is connected to the second reference signal line G2, the other terminal thereof is connected to the pin VDD, and the pin VDD is further connected to the first reference signal line G1. A standby control terminal S1 and a power source terminal V1 of the input interface 101 are both connected to the pin VDD via one diode D, where a cathode of each diode D is connected to the pin VDD.

The embodiments of present disclosure further provide a display device including the above-mentioned display device input circuit. The display device includes all of the technical solutions of the above-mentioned display device input circuit, and thus at least all of the above-mentioned technical effects may be achieved, which will not be repeated here.

The embodiments of the present disclosure further provide a method of controlling the above-mentioned display device described above, including:

controlling a target output channel to be in an active state via a channel selection signal from the control signal terminal, where the target output channel is one group of output channels in multiple groups of output channels of the multiplexing switch circuit; and applying a communication signal to the driving circuit board through the target output channel.

In some embodiments, the output channels include a first output channel connected to a debugging signal input terminal of the driving circuit board 104, a second output channel connected to a control signal input terminal of the driving circuit board 104, a third output channel connected to a Gamma data programming terminal of the driving circuit board 104, and a fourth output channel connected to a serial port communication terminal of the driving circuit board 104.

The applying the communication signal to the driving circuit board through the target output channel includes:

applying a debugging signal to the driving circuit board through the target output channel in a case where the target output channel is the first output channel;

applying a control signal to the driving circuit board through the target output channel in a case where the target output channel is the second output channel;

programming Gamma data to the driving circuit board via the target output channel in a case where the target output channel is the third output channel; and performing serial port communication with the driving circuit board via the target output channel in a case where the target output channel is the fourth output channel.

When a potential of the debugging terminal DE of the input interface 101 is −2.9 V to 5.5 V, the breakdown potential of the first zener diode TD1 is not reached, the first zener diode TD1 is inactive, the first switch transistor Q1 is also not turned on, and the first channel selection sub-signal from the first control terminal 102A to the pin S0 is 1.

The potential of the debugging terminal DE does not reach the breakdown potential of the second zener diode TD2 and the third zener diode TD3, the second zener diode TD2 and the third zener diode TD3 are inactive, the second switch transistor Q2 and the third switch transistor Q3 are each in a turned-off state, and the second channel selection sub-signal from the second control terminal 102B to the pin S1 is 0.

At this time, the first signal terminal SDA and the second signal terminal SCL are electrically connected to the second output channels 1X/1Y. In the case where the input interface 101 is a HDMI interface, the driving circuit board 104 is electrically connected to the I2C of the HDMI interface, so as to obtain the I2C control signal from the input interface 101.

When the potential of the debugging terminal DE of the input interface 101 is 5.6 V to 8 V, the breakdown potential of the first zener diode TD1 is reached, the first zener diode TD1 is active, the first switch transistor Q1 is turned on, and the first channel selection sub-signal from the first control terminal 102A to the pin S0 is 0.

The potential of the debugging terminal DE does not reach the breakdown potential of the second zener diode TD2 and the third zener diode TD3, the second zener diode TD2 and the third zener diode TD3 are inactive, the second switch transistor Q2 and the third switch transistor Q3 are each in a turned-off state, and the second channel selection sub-signal from the second control terminal 102B to the pin S1 is 0.

At this time, the first signal terminal SDA and the second signal terminal SCL are electrically connected to the first output channels 0X/0Y. In the case where the input interface 101 is the HDMI interface, the debugging signal terminal of the driving circuit board 104 is electrically connected to the I2C of the HDMI interface, so as to apply the debugging signal via an I2C signal line to perform signal debugging.

When the potential of the debugging terminal DE of the input interface 101 is less than or equal to −2.9 V, the first zener diode TD1 is inactive, the first switch transistor Q1 is also not turned on, and the first channel selection sub-signal from the first control terminal 102A to the pin S0 is 1.

The second zener diode TD2 is active, the third zener diode TD3 is not active, the second switch transistor Q2 is turned on, the third switch transistor Q3 is turned on, and the second channel selection sub-signal from the second control terminal 102B to the pin S1 is 1.

At this time, the first signal terminal SDA and the second signal terminal SCL are electrically connected to the fourth output channels 3X/3Y, and the I2C of HDMI may serve as one group of separate serial ports and are used in data transmission.

When the potential of the debugging terminal DE of the input interface 101 is greater than or equal to 9 V, the first zener diode TD1 is active, the first switch transistor Q1 is turned on, and the first channel selection sub-signal from the first control terminal 102A to the pin S0 is 0.

The second zener diode TD2 is not active, the third zener diode TD3 is active, the second switch transistor Q2 is turned on, the third switch transistor Q3 is turned on, and the second channel selection sub-signal from the second control terminal 102B to the pin S1 is 1.

At this time, the first signal terminal SDA and the second signal terminal SCL are electrically connected to the third output channels 2X/2Y. The I2C of the HDMI may be used as I2C of TCONLESS to burn GAMMA data.

During the implementation, according to the use requirements, different potentials are applied by the debugging terminal DE, so as to control different output channels of the multiplexing switch circuit 103 to output signals, thereby to further realize different functions. Thus, in the technical solution of the embodiments of the present disclosure, it does not require additional serial ports and debugging sockets, thereby improving the convenience of manufacturing. In addition, after the entire machine is assembled, it is also able to provide different connection controls through the input interface 101, thereby improving the convenience of board debugging and manufacturing of the display device.

The above embodiments are optional embodiments of the present disclosure, it should be appreciated that those ordinary skilled in the art may make various improvements and modifications without departing from the principle of the present disclosure, and theses improvement and modifications shall fall within the scope of the present disclosure.

What is claimed is:

1. A display device input circuit, comprising:

an input interface, wherein the input interface comprises a debugging terminal, a data terminal and a control signal terminal;

a control circuit, wherein an input terminal of the control circuit is connected to the debugging terminal, and the control circuit is configured to generate a channel selection signal according to a debugging signal from the debugging terminal;

a multiplexing switch circuit, wherein an input signal terminal of the multiplexing switch circuit is connected to the control signal terminal, a channel control terminal of the multiplexing switch circuit is connected to an output terminal of the control circuit, the multiplexing switch circuit comprises multiple groups of output channels, and the multiplexing switch circuit is configured to control one group of output channels of the multiple groups of output channels to output a communication signal according to a channel selection signal from the control circuit; and a driving circuit board, wherein a data input terminal of the driving circuit board is connected to the data terminal, the driving circuit board is further connected to the multiple groups of output channels to obtain the communication signal, and an output terminal of the driving circuit board is connected to a display panel.

2. The display device input circuit according to claim 1, wherein the output channels comprise at least two of:

a first output channel connected to a debugging signal input terminal of the driving circuit board;

a second output channel connected to a control signal input terminal of the driving circuit board;

a third output channel connected to a Gamma data programming terminal of the driving circuit board; or a fourth output channel connected to a serial port communication terminal of the driving circuit board.

3. The display device input circuit according to claim 1, wherein the channel control terminal comprises a first control terminal and a second control terminal, and the control circuit comprises:

a first node connected to the debugging terminal;

a first control sub-circuit, wherein the first control sub-circuit is connected to the first node, a first reference signal line, a second reference signal line and the first control terminal, and the first control sub-circuit is configured to apply a first channel selection sub-signal to the first control terminal according to the debugging signal; and a second control sub-circuit, wherein the second control sub-circuit is connected to the first node, the first reference signal line, the second reference signal line and the second control terminal, and the second control sub-circuit is configured to apply a second channel selection sub-signal to the second control terminal according to the debugging signal;

wherein the first reference signal line is configured to apply a high-level reference signal, and the second reference signal line is configured to apply a low-level reference signal.

4. The display device input circuit according to claim 3, wherein the first control sub-circuit comprises:

a first resistor, a first terminal of the first resistor being connected to the first reference signal line, and a second terminal of the first resistor being connected to the first control terminal;

a first switch transistor, a first electrode of the first switch transistor being connected to the second terminal of the first resistor, and a second electrode of the first switch transistor being connected to the second reference signal line;

a second resistor, wherein a first terminal of the second resistor is connected to a control electrode of the first switch transistor; and a first zener diode, wherein an anode of the first zener diode is connected to a second terminal of the second resistor, and a cathode of the first zener diode is connected to the first node.

5. The display device input circuit according to claim 3, wherein the second control sub-circuit comprises:

a second switch transistor, a first electrode of the second switch transistor being connected to the first reference signal line, and a first electrode of the second switch transistor being connected to the second control terminal;

a third resistor, a first terminal of the third resistor being connected to the second control terminal, and a second terminal of the third resistor being connected to the second reference signal line;

a fourth resistor, wherein a first terminal of the fourth resistor is connected to a control electrode of the second switch transistor, and a second terminal of the fourth resistor is connected to a second node;

a fifth resistor, wherein a first terminal of the fifth resistor is connected to the first reference signal line, and a second terminal of the fifth resistor is connected to the second node;

a sixth resistor, wherein a first terminal of the sixth resistor is connected to the second node, and a second terminal of the sixth resistor is connected to the second reference signal line;

a second zener diode, wherein an anode of the second zener diode is connected to the first node;

a first diode, wherein an anode of the first diode is connected to the second node, and a cathode of the first diode is connected to a cathode of the second zener diode;

a third zener diode, a cathode of the third zener diode being connected to the first node;

a seventh resistor, wherein a first terminal of the seventh resistor is connected to an anode of the third zener diode; and a third switch transistor, a control electrode of the third switch transistor being connected to a second terminal of the seventh resistor, a first electrode of the third switch transistor being connected to the second node, and a second electrode of the third switch transistor being connected to the second reference signal line.

6. The display device input circuit according to claim 1, wherein the input interface is a high-definition multimedia interface (HDMI), and the control signal terminal is an internal integrated circuit (IIC) terminal.

7. The display device input circuit according to claim 1, wherein the multiplexing switch circuit comprises an AiP4052 chip.

8. A display device, comprising the display device input circuit according to claim 1.

9. A method of controlling the display device according to claim 8, comprising:

controlling a target output channel to be in an active state via a channel selection signal from the control signal terminal, wherein the target output channel is one group of output channels in multiple groups of output channels of the multiplexing switch circuit; and applying a communication signal to the driving circuit board through the target output channel.

10. The method according to claim 9, wherein the output channels comprise a first output channel connected to a debugging signal input terminal of the driving circuit board, a second output channel connected to a control signal input terminal of the driving circuit board, a third output channel connected to a Gamma data programming terminal of the driving circuit board and a fourth output channel connected to a serial port communication terminal of the driving circuit board; and the applying the communication signal to the driving circuit board through the target output channel comprises:

applying a debugging signal to the driving circuit board through the target output channel in a case where the target output channel is the first output channel;

applying a control signal to the driving circuit board through the target output channel in a case where the target output channel is the second output channel;

programming Gamma data to the driving circuit board via the target output channel in a case where the target output channel is the third output channel; and performing serial port communication with the driving circuit board via the target output channel in a case where the target output channel is the fourth output channel.

11. The method according to claim 9, wherein the channel control terminal comprises a first control terminal and a second control terminal, and the control circuit comprises:

a first node connected to the debugging terminal;

a first control sub-circuit, wherein the first control sub-circuit is connected to the first node, a first reference signal line, a second reference signal line and the first control terminal, and the first control sub-circuit is configured to apply a first channel selection sub-signal to the first control terminal according to the debugging signal; and a second control sub-circuit, wherein the second control sub-circuit is connected to the first node, the first reference signal line, the second reference signal line and the second control terminal, and the second control sub-circuit is configured to apply a second channel selection sub-signal to the second control terminal according to the debugging signal;

wherein the first reference signal line is configured to apply a high-level reference signal, and the second reference signal line is configured to apply a low-level reference signal.

12. The method according to claim 11, wherein the first control sub-circuit comprises:

a first resistor, a first terminal of the first resistor being connected to the first reference signal line, and a second terminal of the first resistor being connected to the first control terminal;

a first switch transistor, a first electrode of the first switch transistor being connected to the second terminal of the first resistor, and a second electrode of the first switch transistor being connected to the second reference signal line;

a second resistor, wherein a first terminal of the second resistor is connected to a control electrode of the first switch transistor; and a first zener diode, wherein an anode of the first zener diode is connected to a second terminal of the second resistor, and a cathode of the first zener diode is connected to the first node.

13. The method according to claim 11, wherein the second control sub-circuit comprises:

a second switch transistor, a first electrode of the second switch transistor being connected to the first reference signal line, and a first electrode of the second switch transistor being connected to the second control terminal;

a third resistor, a first terminal of the third resistor being connected to the second control terminal, and a second terminal of the third resistor being connected to the second reference signal line;

a fourth resistor, wherein a first terminal of the fourth resistor is connected to a control electrode of the second switch transistor, and a second terminal of the fourth resistor is connected to a second node;

a fifth resistor, wherein a first terminal of the fifth resistor is connected to the first reference signal line, and a second terminal of the fifth resistor is connected to the second node;

a sixth resistor, wherein a first terminal of the sixth resistor is connected to the second node, and a second terminal of the sixth resistor is connected to the second reference signal line;

a second zener diode, wherein an anode of the second zener diode is connected to the first node;

a first diode, wherein an anode of the first diode is connected to the second node, and a cathode of the first diode is connected to a cathode of the second zener diode;

a third zener diode, a cathode of the third zener diode being connected to the first node;

a seventh resistor, wherein a first terminal of the seventh resistor is connected to an anode of the third zener diode; and a third switch transistor, a control electrode of the third switch transistor being connected to a second terminal of the seventh resistor, a first electrode of the third switch transistor being connected to the second node, and a second electrode of the third switch transistor being connected to the second reference signal line.

14. The method according to claim 9, wherein the input interface is a high-definition multimedia interface (HDMI), and the control signal terminal is an internal integrated circuit (IIC) terminal.

15. The display device according to claim 8, wherein the output channels comprise at least two of:

a first output channel connected to a debugging signal input terminal of the driving circuit board;

a second output channel connected to a control signal input terminal of the driving circuit board;

a third output channel connected to a Gamma data programming terminal of the driving circuit board;

or a fourth output channel connected to a serial port communication terminal of the driving circuit board.

16. The display device according to claim 8, wherein the channel control terminal comprises a first control terminal and a second control terminal, and the control circuit comprises:

a first node connected to the debugging terminal;

a first control sub-circuit, wherein the first control sub-circuit is connected to the first node, a first reference signal line, a second reference signal line and the first control terminal, and the first control sub-circuit is configured to apply a first channel selection sub-signal to the first control terminal according to the debugging signal; and a second control sub-circuit, wherein the second control sub-circuit is connected to the first node, the first reference signal line, the second reference signal line and the second control terminal, and the second control sub-circuit is configured to apply a second channel selection sub-signal to the second control terminal according to the debugging signal;

wherein the first reference signal line is configured to apply a high-level reference signal, and the second reference signal line is configured to apply a low-level reference signal.

17. The display device according to claim 16, wherein the first control sub-circuit comprises:

a first resistor, a first terminal of the first resistor being connected to the first reference signal line, and a second terminal of the first resistor being connected to the first control terminal;

a first switch transistor, a first electrode of the first switch transistor being connected to the second terminal of the first resistor, and a second electrode of the first switch transistor being connected to the second reference signal line;

a second resistor, wherein a first terminal of the second resistor is connected to a control electrode of the first switch transistor; and a first zener diode, wherein an anode of the first zener diode is connected to a second terminal of the second resistor, and a cathode of the first zener diode is connected to the first node.

18. The display device according to claim 16, wherein the second control sub-circuit comprises:

a second switch transistor, a first electrode of the second switch transistor being connected to the first reference signal line, and a first electrode of the second switch transistor being connected to the second control terminal;

a third resistor, a first terminal of the third resistor being connected to the second control terminal, and a second terminal of the third resistor being connected to the second reference signal line;

a fourth resistor, wherein a first terminal of the fourth resistor is connected to a control electrode of the second switch transistor, and a second terminal of the fourth resistor is connected to a second node;

a fifth resistor, wherein a first terminal of the fifth resistor is connected to the first reference signal line, and a second terminal of the fifth resistor is connected to the second node;

a sixth resistor, wherein a first terminal of the sixth resistor is connected to the second node, and a second terminal of the sixth resistor is connected to the second reference signal line;

a second zener diode, wherein an anode of the second zener diode is connected to the first node;

a first diode, wherein an anode of the first diode is connected to the second node, and a cathode of the first diode is connected to a cathode of the second zener diode;

a third zener diode, a cathode of the third zener diode being connected to the first node;

a seventh resistor, wherein a first terminal of the seventh resistor is connected to an anode of the third zener diode; and a third switch transistor, a control electrode of the third switch transistor being connected to a second terminal of the seventh resistor, a first electrode of the third switch transistor being connected to the second node, and a second electrode of the third switch transistor being connected to the second reference signal line.

19. The display device according to claim 8, wherein the input interface is a high-definition multimedia interface (HDMI), and the control signal terminal is an internal integrated circuit (IIC) terminal.

20. The display device according to claim 8, wherein the multiplexing switch circuit comprises an AiP4052 chip.

* * * * *